United States Patent
Baldwin et al.

(10) Patent No.: US 9,697,187 B2
(45) Date of Patent: *Jul. 4, 2017

(54) SYSTEM AND METHOD FOR WEB CONTENT PRESENTATION MANAGEMENT

(71) Applicant: International Business Machines Corporation, Armonk, NY (US)

(72) Inventors: Nicholas A. Baldwin, Gladesville (AU); Mark C. Hampton, Carlton (AU); Stefan A. Hepper, San Jose, CA (US); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,738

(22) Filed: Nov. 14, 2013

(65) Prior Publication Data

US 2014/0281907 A1 Sep. 18, 2014

Related U.S. Application Data

(63) Continuation of application No. 13/835,792, filed on Mar. 15, 2013.

(51) Int. Cl.
*G06F 17/22* (2006.01)
*G06F 17/00* (2006.01)

(52) U.S. Cl.
CPC ................ *G06F 17/2247* (2013.01)

(58) Field of Classification Search
CPC ............ G06F 17/2247; G06F 17/3089
See application file for complete search history.

(56) References Cited

U.S. PATENT DOCUMENTS 7,047,485 B1 * 5/2006 Klein ............... G06F 17/30902
707/E17.12
7,134,084 B1 * 11/2006 Rashid ............... G06F 17/212
715/235

(Continued)

FOREIGN PATENT DOCUMENTS

WO 2012087285 A1 6/2012

OTHER PUBLICATIONS

Internet Media Type, Dec. 24, 2012, pp. 1-7 https://web.archive.org/web/20121224065340/http://en.wikipedia.org/wiki/Internet_media_type.*

(Continued)

*Primary Examiner* — Scott Baderman
*Assistant Examiner* — Mario M Velez-Lopez
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, by a computing device, a selection of one or more presentation templates of a plurality of presentation templates for at least a portion of a web page, wherein the one or more presentation templates define, at least in part, a display format for one or more display types. At least a portion of the one or more display types is mapped to one or more content elements within a content type. At least the portion of the one or more presentation templates is rendered when the one or more content elements are requested, wherein rendering includes retrieving at least the portion of the one or more content elements from one or more of each content item to be rendered within each of the one or more presentation templates, wherein rendering further includes using the content type of the one or more content elements requested to dynamically map the one or more content (Continued)

elements defined in the one or more display types to the one or more presentation templates.

7 Claims, 7 Drawing Sheets

(56) References Cited

U.S. PATENT DOCUMENTS

| | | | | |
|---|---|---|---|---|
| 8,078,963 | B1* | 12/2011 | Rosner | G06F 17/21 |
| | | | | 715/247 |
| 8,265,942 | B2 | 9/2012 | Doyle et al. | |
| 8,433,999 | B2* | 4/2013 | Hicks | G06F 17/3089 |
| | | | | 715/234 |
| 8,555,200 | B2* | 10/2013 | Hicks | G06F 17/3089 |
| | | | | 715/754 |
| 8,627,192 | B2* | 1/2014 | Lanahan | G06T 11/60 |
| | | | | 358/1.18 |
| 9,032,298 | B2* | 5/2015 | Segal | G06Q 30/02 |
| | | | | 715/723 |
| 9,323,737 | B2* | 4/2016 | Yang | G06F 17/248 |
| 9,349,109 | B2* | 5/2016 | Lettau | G06Q 10/0631 |
| 2002/0029208 | A1* | 3/2002 | Josephson | G06F 17/30575 |
| 2004/0268299 | A1* | 12/2004 | Lei | G06F 9/4443 |
| | | | | 717/106 |
| 2005/0268279 | A1* | 12/2005 | Paulsen | G06F 8/38 |
| | | | | 717/110 |
| 2006/0206807 | A1* | 9/2006 | Rosner | G06F 17/248 |
| | | | | 715/234 |
| 2006/0212804 | A1* | 9/2006 | Jackson | G06F 17/211 |
| | | | | 715/207 |
| 2006/0265725 | A1* | 11/2006 | Barnes | G06Q 30/02 |
| | | | | 725/32 |
| 2007/0136320 | A1* | 6/2007 | Sah | G06Q 30/02 |
| 2007/0162846 | A1* | 7/2007 | Cave | G06F 17/3089 |
| | | | | 715/210 |
| 2010/0070847 | A1 | 3/2010 | Hampton et al. | |
| 2012/0216108 | A1 | 8/2012 | Yambal et al. | |
| 2012/0221449 | A1* | 8/2012 | Kief | G06F 17/3089 |
| | | | | 705/34 |
| 2014/0282115 | A1* | 9/2014 | Balogh | G06F 17/30902 |
| | | | | 715/760 |

OTHER PUBLICATIONS

Abu Kasim et al., Virtual-Learning Content Management System for Problem-Based Learning (PBL) Courses, http://ieeexplore.ieee.org/xpl/articleDetails.jsp?tp=&arnumber=6271356&contentType=Conference+Publications&sortType%3Ddesc_p_Publication_Year%26pageNumber%3D2%26queryText%3DWeb+Content+Management+System downloaded on Feb. 5, 2013, IEEE Xplore, pp. 1-2.

N. Heino et al., "Managing Web Content Using Linked Data Principles—Combining Semantic Structure with Dynamic Cotent Syndication," http://ieeexplore.ieee.org/xpl/articleDetails.jsp?tp=&arnumber=6032349&contentType=Conference+Publications&searchWithin%3Dcontent+templates%26sortType%3Ddesc_p_Publication_Year%26queryText%3DWeb+Content+Management+System, downloaded on Feb. 5, 2013, IEEE Xplore, pp. 1-2.

Si Jiaquan et al., "A Template-Based Forum Posts Content Extraction Method," http://ieeexplore.ieee.org/xpl/articleDetails.jsp?tp=&arnumber=6032349&contentType=Conference+Publications&searchWithin%3Dcontent+templates%26sortType%3Ddesc_p_Publication_Year%26queryText%3DWeb+Content+Management+System, downloaded on Feb. 5, 2013, IEEE Xplore, pp. 1-2.

* cited by examiner

500 — Summary Display Type
600 — Placeholders
- Heading
- Image
- Small Image
- Paragraph Text
- Link

FIG. 6

SYSTEM AND METHOD FOR WEB CONTENT PRESENTATION MANAGEMENT

RELATED APPLICATIONS

The subject application is a continuation application of U.S. patent application with Ser. No. 13/835,792, filed on Mar. 15, 2013, the entire content of which is herein incorporated by reference.

BACKGROUND

A content management system (e.g., a web content management system) may include the ability to identify and deliver the appropriate presentation for web content that a visitor of the associated website/webpage has requested. This may be easier for an individual piece of content; however, websites typically utilize several different views of the same content (e.g., depending on the visitor's location and context within the website). For example, the home page of a news website may have top news stories portrayed in a manner to grab a visitor's attention, such as an image, a headline, and then a summary or the start of the news item itself. In the example, if the visitor navigates deeper into the website, the same article may appear (often in multiple places) in a more succinct manner (e.g., within lists or indexes of content for that particular section/topic/category). In the example, the same news article may simply be listed with a title and short description, or just a title. If the visitor selects that news item, they may be taken to the individual article where it may be seen in full.

These different views may show the same content, but may all be different views or aspects of the same item (e.g., showing just a subset of the elements that make up the full item, while in many cases also including additional elements that may not be thought of as part of the original article). For instance, the summary in the above example may be used only in a "top news stories" list on the home page, but not shown elsewhere or even in the article itself.

These goals may be accomplished within most web content management systems by modeling the different types of content items required and by developing multiple "views" or presentation templates (e.g., markup like HTML or a server-side script like JSP which may be resolved to HTML) that may be applied to each content type. Multiple presentation templates may then be built to dynamically present the various views required for each content type, e.g., a news article may require a feature view, a summary view, a short link view, and a full view all to be built. Having too many different presentation components (views) built to handle the display of different content types within different contexts may result in extra effort to maintain the web content management system.

BRIEF SUMMARY OF DISCLOSURE

In one implementation, a method, performed by one or more computing devices, comprises receiving, by a computing device, a selection of one or more presentation templates of a plurality of presentation templates for at least a portion of a web page, wherein the one or more presentation templates define, at least in part, a display format for one or more display types. At least a portion of the one or more display types is mapped to one or more content elements within a content type. At least the portion of the one or more presentation templates is rendered when the one or more content elements are requested, wherein rendering includes retrieving at least the portion of the one or more content elements from one or more of each content item to be rendered within each of the one or more presentation templates, wherein rendering further includes using the content type of the one or more content elements requested to dynamically map the one or more content elements defined in the one or more display types to the one or more presentation templates.

One or more of the following features may be included. The one or more display types may define one or more external dependencies to be filled by the one or more content items for rendering via the one or more presentation templates. Rendering may further include rendering the content item within the one or more presentation templates at a location indicated in a markup associated with the one or more presentation templates. Mapping may include receiving a selection of the one or more content elements. The one or more presentation templates may enable display of a common view for different content types. Rendering may further include pre-caching one or more views of the web page. The one or more display types may be selected via a user interface.

In another implementation, a computing system includes a processor and a memory configured to perform operations comprising receiving a selection of one or more presentation templates of a plurality of presentation templates for at least a portion of a web page, wherein the one or more presentation templates define, at least in part, a display format for one or more display types. At least a portion of the one or more display types is mapped to one or more content elements within a content type. At least the portion of the one or more presentation templates is rendered when the one or more content elements are requested, wherein rendering includes retrieving at least the portion of the one or more content elements from one or more of each content item to be rendered within each of the one or more presentation templates, wherein rendering further includes using the content type of the one or more content elements requested to dynamically map the one or more content elements defined in the one or more display types to the one or more presentation templates.

One or more of the following features may be included. The one or more display types may define one or more external dependencies to be filled by the one or more content items for rendering via the one or more presentation templates. Rendering may further include rendering the content item within the one or more presentation templates at a location indicated in a markup associated with the one or more presentation templates. Mapping may include receiving a selection of the one or more content elements. The one or more presentation templates may enable display of a common view for different content types. Rendering may further include pre-caching one or more views of the web page. The one or more display types may be selected via a user interface.

In another implementation, a computer program product resides on a computer readable storage medium that has a plurality of instructions stored on it. When executed by a processor, the instructions cause the processor to perform operations comprising receiving a selection of one or more presentation templates of a plurality of presentation templates for at least a portion of a web page, wherein the one or more presentation templates define, at least in part, a display format for one or more display types. At least a portion of the one or more display types is mapped to one or more content elements within a content type. At least the portion of the one or more presentation templates is rendered when the one or more content elements are requested, wherein rendering includes retrieving at least the portion of the one or more content elements from one or more of each content item to be rendered within each of the one or more presentation templates, wherein rendering further includes using the content type of the one or more content elements requested to dynamically map the one or more content elements defined in the one or more display types to the one or more presentation templates.

One or more of the following features may be included. The one or more display types may define one or more external dependencies to be filled by the one or more content items for rendering via the one or more presentation templates. Rendering may further include rendering the content item within the one or more presentation templates at a location indicated in a markup associated with the one or more presentation templates. Mapping may include receiving a selection of the one or more content elements. The one or more presentation templates may enable display of a common view for different content types. Rendering may further include pre-caching one or more views of the web page. The one or more display types may be selected via a user interface.

The details of one or more implementations are set forth in the accompanying drawings and the description below. Other features and advantages will become apparent from the description, the drawings, and the claims.

BRIEF DESCRIPTION OF THE DRAWINGS

FIG. 6 is an illustrative diagrammatic view of a Summary Display Type with Placeholders according to one or more implementations of the present disclosure.

Like reference symbols in the various drawings indicate like elements.

DETAILED DESCRIPTION

System Overview

Figure 1:
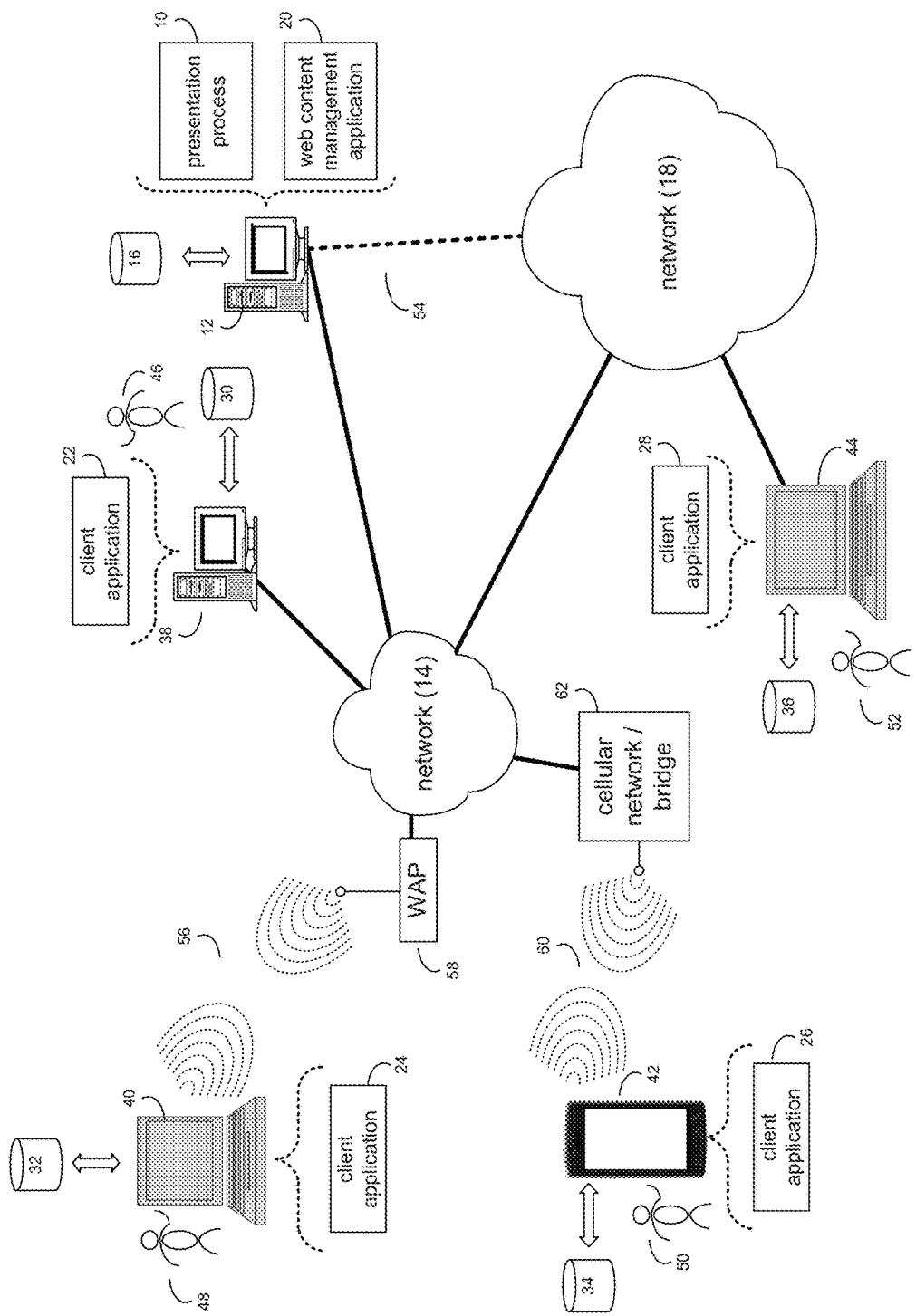
FIG. 1 is an illustrative diagrammatic view of a presentation process coupled to a distributed computing network according to one or more implementations of the present disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown presentation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows® Mac® OS X® Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, presentation process 10 may receive, by a computing device, a selection of one or more presentation templates of a plurality of presentation templates for at least a portion of a web page, wherein the one or more presentation templates define, at least in part, a display format for one or more display types. At least a portion of the one or more display types may be mapped to one or more content elements within a content type. At least the portion of the one or more presentation templates may be rendered when the one or more content elements are requested, wherein rendering may include retrieving at least the portion of the one or more content elements from one or more of each content item to be rendered within each of the one or more presentation templates, wherein rendering may further include using the content type of the one or more content elements requested to dynamically map the one or more content elements defined in the one or more display types to the one or more presentation templates.

The instruction sets and subroutines of presentation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Presentation process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a content management application (e.g., web content management application 20), examples of which may include, but are not limited to, e.g., an offline processing web content management application, an online processing web content management application, a hybrid online/offline processing web content management application, or other application that allows for authoring, collaboration, and administration tools used to create and manage content (e.g., website content). Presentation process 10 and/or web content management application 20 may be accessed via client applications 22, 24, 26, 28. Presentation process 10 may be a stand alone application, or may be an applet/application/script that may interact with and/or be executed within web content management application 20 and/or one or more of client applications 22, 24, 26, 28. Web content management application 20 may be a stand alone application, or may be an applet/application/script that may interact with and/or be executed within presentation process 10 and/or one or more of client applications 22, 24, 26, 28. One or more of client applications 22, 24, 26, 28 may be a stand alone application, or may be an applet/application/script that may interact with and/or be executed within presentation process 10 and/or web content management application 20. Examples of client applications 22, 24, 26, 28 may include, but are not limited to, e.g., an offline processing web content management application, an online processing web content management application, a hybrid online/offline processing web content management application, or other application that allows for authoring, collaboration, and administration tools used to create and manage content (e.g., website content), a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of presentation process 10 (and vice versa). Accordingly, presentation process 10 may be a purely server-side application, a purely client-side application, or a hybrid server-side/client-side application that is cooperatively executed by one or more of client applications 22, 24, 26, 28 and/or presentation process 10.

One or more of client applications 22, 24, 26, 28 may be configured to effectuate some or all of the functionality of web content management application 20 (and vice versa). Accordingly, web content management application 20 may be a purely server-side application, a purely client-side application, or a hybrid server-side/client-side application that is cooperatively executed by one or more of client applications 22, 24, 26, 28 and/or web content management application 20. As one or more of client applications 22, 24, 26, 28, presentation process 10, and web content management application 20, taken singly or in any combination, may effectuate some or all of the same functionality, any description of effectuating such functionality via one or more of client applications 22, 24, 26, 28, presentation process 10, web content management application 20, or combination thereof, and any described interaction(s) between one or more of client applications 22, 24, 26, 28, presentation process 10, web content management application 20, or combination thereof to effectuate such functionality, should be taken as an example only and not to limit the scope of the disclosure.

Users 46, 48, 50, 52 may access computer 12 and presentation process 10 (e.g., using one or more of client electronic devices 38, 40, 42, 44) directly through network 14 or through secondary network 18. Further, computer 12 may be connected to network 14 through secondary network 18, as illustrated with phantom link line 54. Presentation process 10 may include one or more user interfaces, such as browsers and textual or graphical user interfaces, through which users 46, 48, 50, 52 may access presentation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
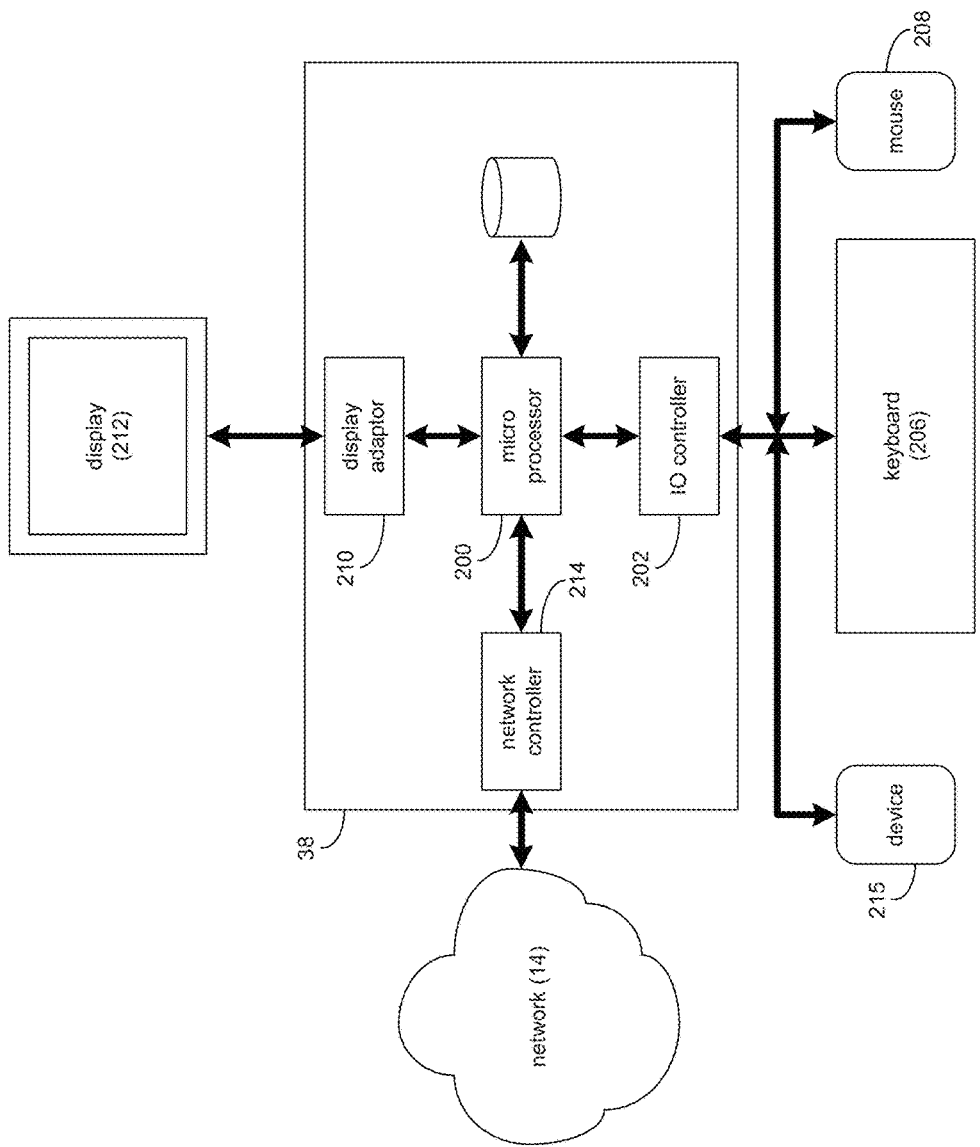
FIG. 2 is a diagrammatic view of a client electronic device of FIG. 1 according to one or more implementations of the present disclosure.
Figure 3:
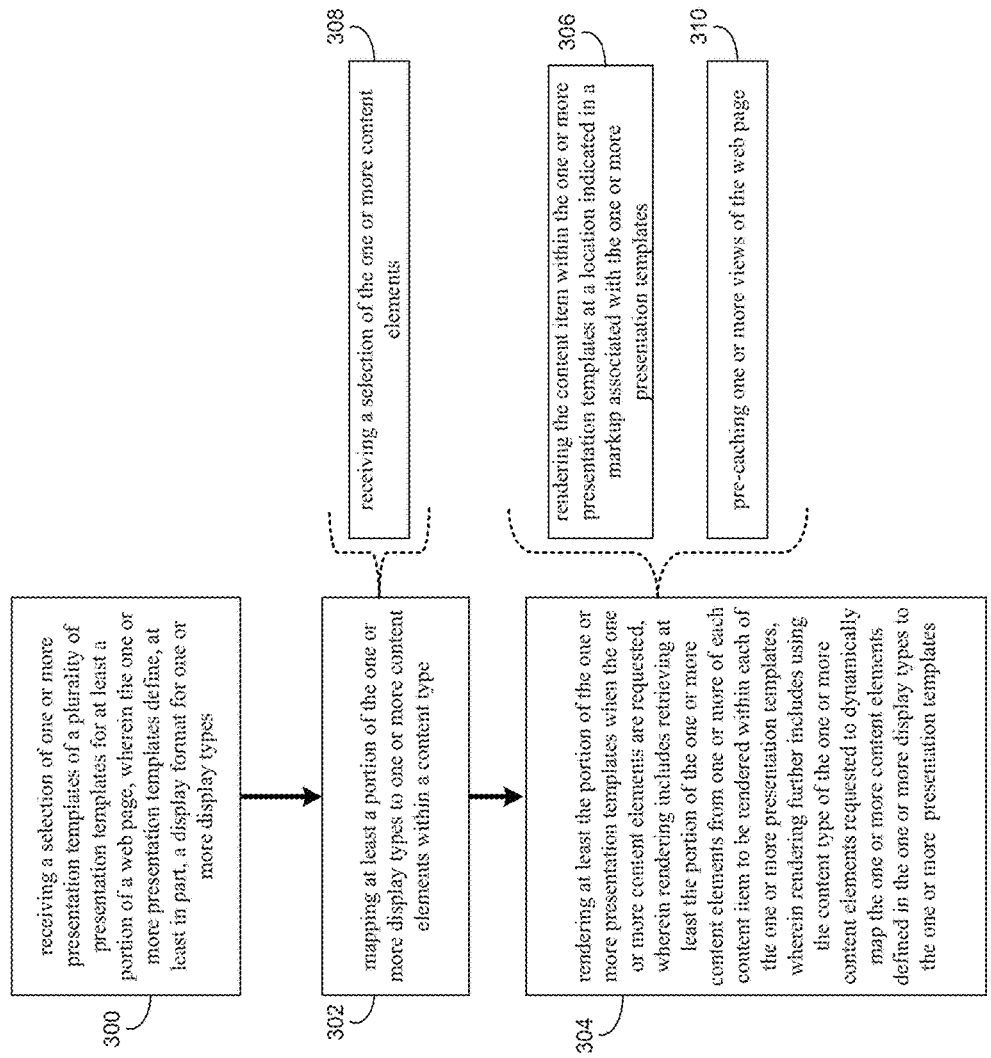
FIG. 3 is an illustrative flowchart of the presentation process of FIG. 1 according to one or more implementations of the present disclosure.
Figure 4:
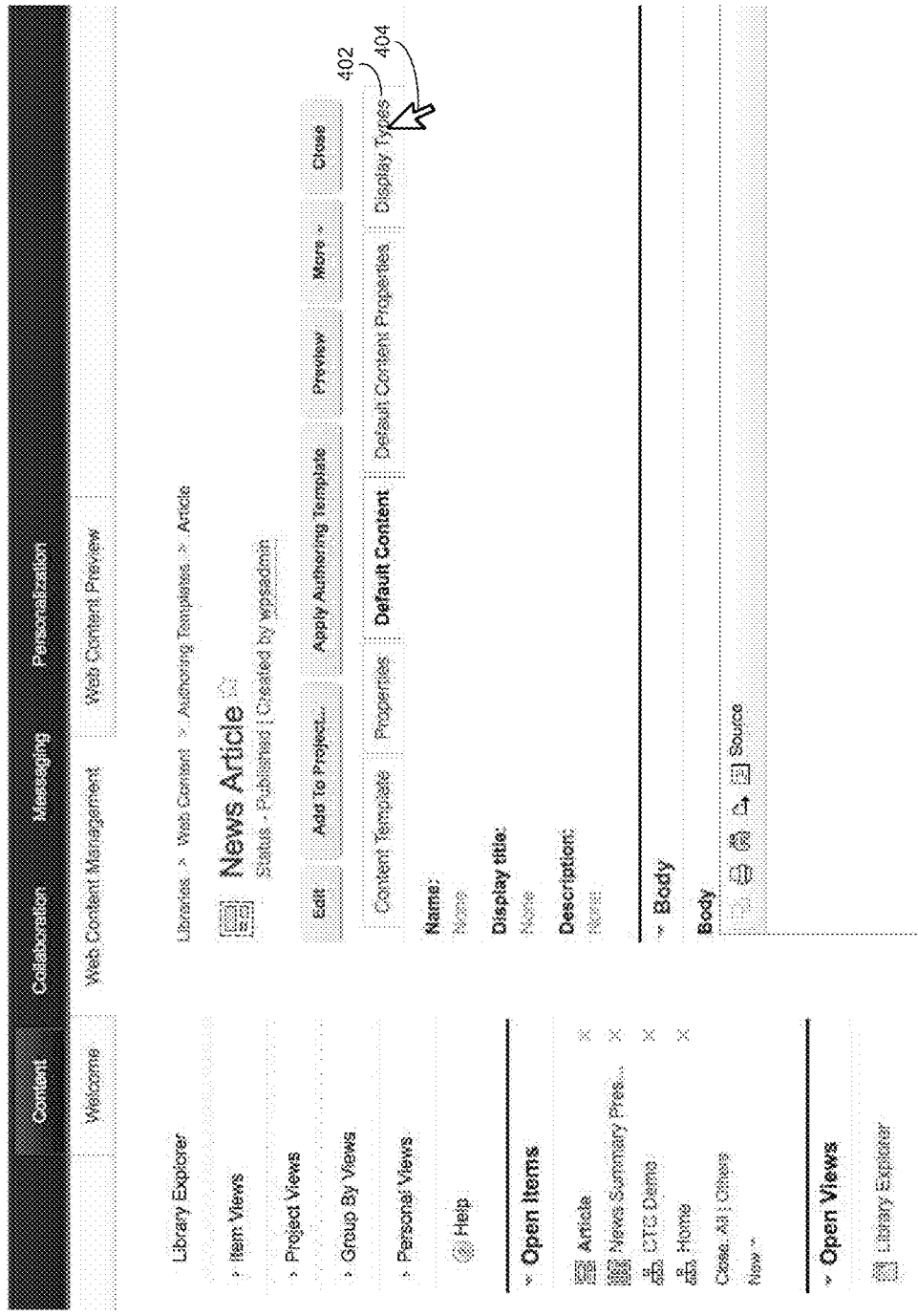
FIG. 4 is an illustrative diagrammatic view of a screen image displayed by the presentation process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, presentation process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

In some instances, a content management system (e.g., a web content management system) may include the ability to identify and deliver the appropriate presentation for web content that a visitor of the associated web site has requested. This may be easier for an individual piece of content; however, websites may utilize several different views of the same content (e.g., depending on the visitor's location and context within the website). For example, the home page of a news website may have top news stories portrayed in a manner to grab a visitor's attention, such as an image, a headline, and then a summary or the start of the news item itself. In the example, if the visitor navigates deeper into the website, the same article may appear (often in multiple places) in a more succinct manner (e.g., within lists or indexes of content for that particular section/topic/category). In the example, the same news article may simply be listed with a title and short description, or just a title. If the visitor selects that news item, they may be taken to the individual article where it may be seen in full.

These different views may show the same content, but may all be different views or aspects of the same item (e.g., showing just a subset of the elements that make up the full item, while in many cases also including additional elements that may not be thought of as part of the original article). For instance, the summary in the above example may be used only in a "top news stories" list on the home page, but not shown elsewhere or even in the article itself.

These goals may be accomplished within an illustrative web content management systems by modeling the different types of content items required and by developing multiple "views" or presentation templates (e.g., markup like HTML or a server-side script like JSP which may be resolved to HTML) that may be applied to each content type. Multiple presentation templates may then be built to dynamically present the various views required for each content type, e.g., a news article may require a feature view, a summary view, a short link view, and a full view all to be built.

Each content type may be composed of relevant, named elements. For example, a News content type may include elements such as title, summary, description, author, introduction, body, etc. As each content type may include its own structure, each element may be referenced as required in each of the different presentation templates (e.g., the summary presentation template for a news article may require the title, introduction and author fields). The other managed content types may include their own various elements; some very specific, some shared across one or more content types. In some instances, the presentation templates for each of the views for each of these content types may therefore be built to reference the appropriate elements to display (e.g., for a person profile content type, a profile summary presentation template may need to be built and may require the name, job description and manager fields, which may be quite different than a news item summary presentation template).

Some web content management systems may require the creation of these views for each item type, e.g., there may be a different detail presentation template for every content type (or at least for each group of similar content types). Some web content management systems may allow for a single presentation template to be used for multiple item types, but any unique elements from the various item types may need to be specified within the presentation template. This approach may result in much of the presentation markup being the same, e.g., the Summary view markup for a news article and a media release may look structurally the same in that they both may display an image and text; however, the elements referenced may be different.

Such an approach may result in numerous different presentation components (e.g., views) built to handle the display of different content types within different contexts, which may result in extra effort to maintain the web content management system. If the website builder chooses to add/modify a number of elements across a number of different content types (e.g., the introduction of a new content classification scheme) the updates may also have to be made in multiple views/templates within the system, which may be a lot of extra work and time consuming for the user.

In some instances, if the content types are updated, the updates to the presentation components may require manual steps, and as the web content management systems may be loosely coupled, there may be no indication where changes may need to be made, and often may not include referential integrity. In some instances, if these changes are not made within the presentation layer once the changes are introduced in the authoring system associated with the web content management system, then the views may not display the content as intended.

In some instances, web content management systems may attempt to circumvent this issue by modeling the content itself as XML and then transforming the content into the various views required; however, the transformations may still need to be defined and updated each time the content model is updated, and it may be a manual process to identify the tags that need to be updated. Further, an XML-based authoring system may not be appropriate for the majority of users who create content (e.g., XML authoring may be focused on semantically tagged text rather than a WYSIWYG view of what end users will actually see and interact with), particularly for non-technical users that may be responsible for customer facing internet sites.

In some instances, while removing the need to maintain multiple presentation templates, there may now be multiple transformation objects or scripts to manage and maintain. Moreover, some web content management systems which are more orientated towards managing documents or media assets may create multiple "renditions" of an item (e.g., various formats from a master (source) item, such as an image which may be output in different file formats, or transformed (e.g., compressed, cropped, resized, etc.) in some way). This approach also may be applied to multi-element content items, and while it may be simpler to manage the rendition definitions, they still may either reference specific elements or transform elements according to a predefined pattern, on a per element or per content type basis. As such, the above approaches may still require extra effort to maintain the web content management system.

The Presentation Process:

As discussed above and referring also to FIGS. 3-7, presentation process 10 may receive 300, by a computing device, a selection of one or more presentation templates of a plurality of presentation templates for at least a portion of a web page, wherein the one or more presentation templates define, at least in part, a display format for one or more display types. At least a portion of the one or more display types may be mapped 302 to one or more content elements within a content type by presentation process 10. At least the portion of the one or more presentation templates may be rendered 304 by presentation process 10 when the one or more content elements are requested, wherein rendering may include retrieving at least the portion of the one or more content elements from one or more of each content item to be rendered within each of the one or more presentation templates, wherein rendering may further include using the content type of the one or more content elements requested to dynamically map the one or more content elements defined in the one or more display types to the one or more presentation templates.

Generally, in Web Content Management (WCM) systems, "Content Types" may define the structure of content items and "Presentation Templates" may define which content elements to display. There is then some mapping between the two objects to determine how content items are actually displayed. However, in some implementations, as will be explained in greater detail below, presentation process 10 may introduce a new model for how content is utilized, presented and consumed within an associated website. For instance, rather than duplicate presentation templates for a similar display of different item types, presentation process 10 may instead allow users to model how the different pages/sections of the website will display content from the various item types, and provide a mechanism for the different items types to contribute different elements to display within the same markup defined by the presentation template. As such, the present disclosure may focus on the true separation of presentation artifacts from the content being displayed in such an example technique that those two parts may be maintained separately. This approach may address one or more of the above-noted issues with existing systems in which the presentation may be tightly tied to the content being displayed, such that when changes occur to the content structure, the presentation also may need to be updated.

For example, in some implementations, presentation process 10 may receive 300, by a computing device (e.g., client electronic device 38), a selection of one or more presentation templates of a plurality of presentation templates for at least a portion of a web page (e.g., the web page itself, items contained or referenced within the web page, etc.), wherein the one or more presentation templates define, at least in part, a display format for one or more display types. For instance, an example technique to achieve the above-noted separation of presentation (template) artifacts from the content being displayed may include the "Display Type". The "Display Types" of a presentation may include some or all of the presentation's external dependencies that may be filled by the content item that is being displayed through the presentation. As will be discussed in greater detail below, the external dependencies may be represented by placeholder fields in the Display Type. For instance, the Display Type (via presentation process 10) may manage the list of "placeholders" and may map them to the content elements that are set onto a content item from its content type. Each Display Type (or "placeholder") may define one or more of the above-noted external dependencies to be filled by the one or more content items for rendering via the Presentation Template. For instance, the "Display Type" may be referred to as a "Placeholder" that may signify that this artifact should be retrieved from the content and displayed within the presentation at the point in which the placeholder has been positioned in the markup. The external dependencies of the presentation (e.g., the pieces of data needed to complete the presentation) have been identified in the presentation by presentation process 10. In some implementations, the above-noted web page may include many component parts (e.g., content items), and each content item may use a presentation template to determine its display. Thus, in some implementations, multiple presentation templates may be used in the construction of the web page.

Figure 5:
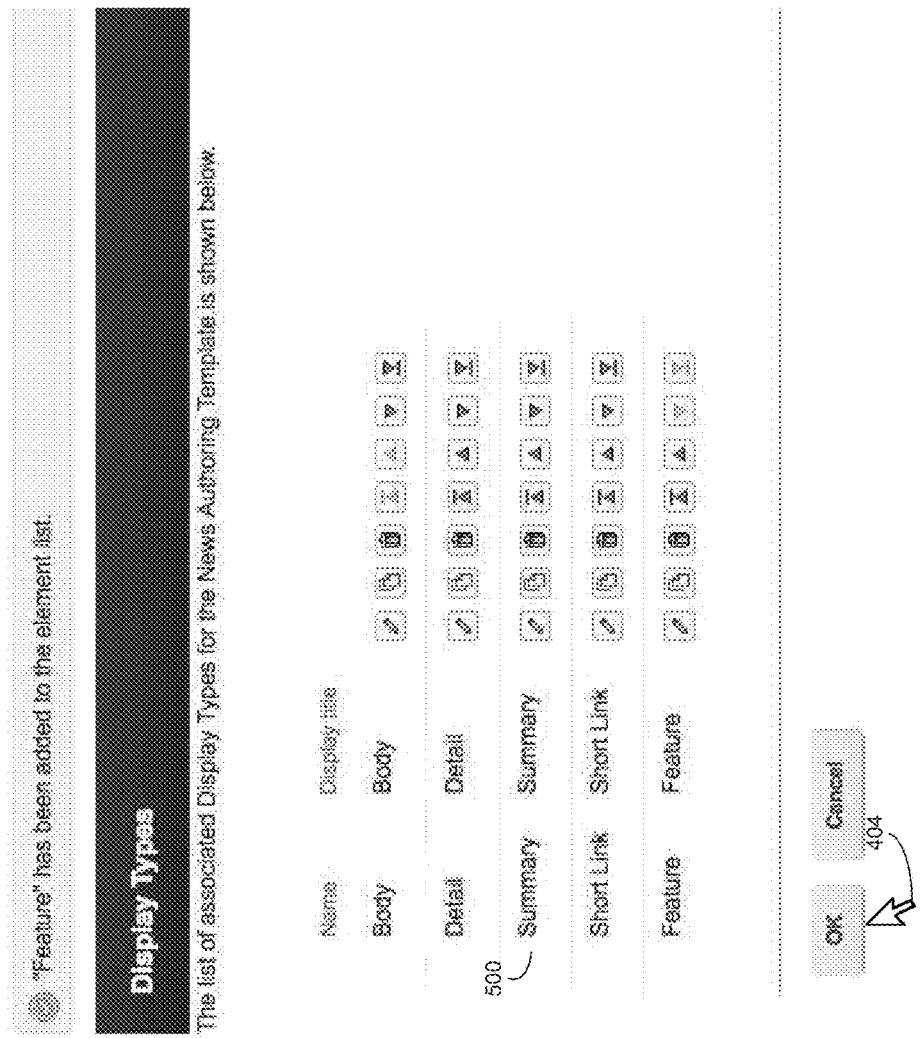
FIG. 5 is an illustrative diagrammatic view of a screen image displayed by the presentation process of FIG. 1 according to one or more implementations of the present disclosure.
Figure 7:
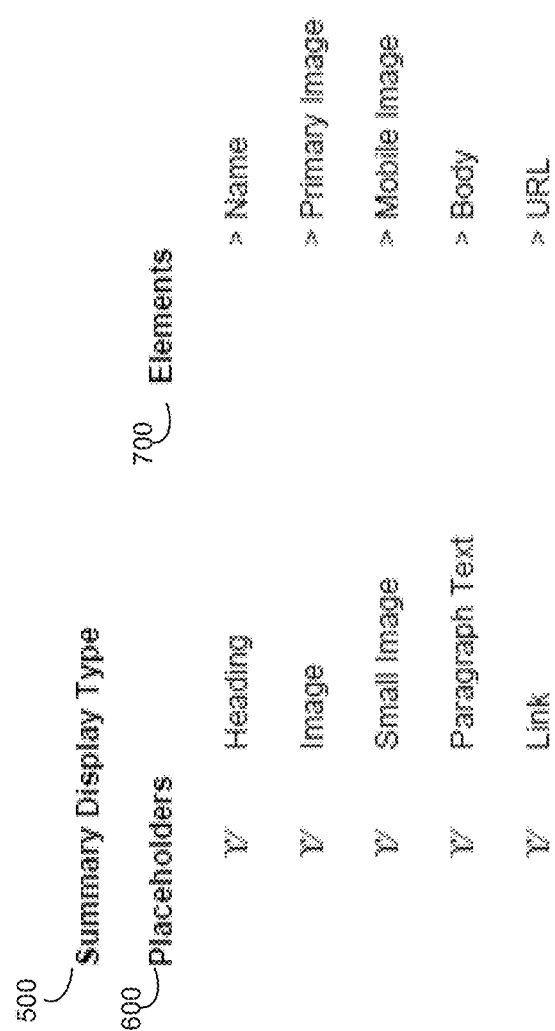
FIG. 7 is an illustrative diagrammatic view of a Summary Display Type with Placeholders and Content Elements according to one or more implementations of the present disclosure.

In some implementations, the selection of the presentation template and/or the one or more display types may be received via a user interface. For instance, and referring at least to FIG. 4, a user interface (e.g., user interface 400) associated with presentation process 10 may include, an "Authoring Template" or content type (such as a "News Authoring Template" or "News Content Type"). The terms Authoring Template and content type may be used interchangeably where appropriate. The News Authoring Template may include, e.g., one or more tabs (or dialogs). For example, "Display Types" tab 402 may be provided as an object in user interface 400 that when selected by, e.g., a pointing device (e.g., curser 404 of mouse 208), may present via user interface 400 a list of associated display types for the News Anchoring Template. For instance, and referring at least to FIG. 5, presentation process 10 may show the display types in the News Authoring Template that have been defined for this content type. Presentation process 10 may receive a selection of one or more of the example Display Types (e.g., from user 48 via the above-noted curser). Other objects (e.g., icons) that may be displayed via user interface 400 may include, e.g., "edit", "copy", "delete", "default settings", "arrows" to move up and down, "create" to allow the user to launch the dialog to create new Display Types, etc.

In some implementations, at least a portion of the one or more display types may be mapped 302 to one or more content elements within a content type by presentation process 10. For example, the content elements may be defined by the content type and set onto content items created using those content types. In some implementations, the content elements may come from a content item, and not necessarily from the parent content type. The mapping 302 may be from the display type to the content elements defined by the presentation template, and the values for the content elements may come from the content items being requested. User interface 400 may include an icon (or a link to manage/edit the display type) that may enable the user (via presentation process 10) to map the elements from the content item/content template to the placeholder fields in the Display Type used in the presentation template. In some implementations, to complete the above-noted external dependency, presentation process 10 may map 302 these items to the actual fields that make up the content (Document) that is being viewed. The role of mapping the fields of a content item to the presentation dependencies ("Display Type"/"Placeholder") falls to the content type definition (e.g., the Authoring Template and/or the like). These content definitions may set the fields that make up the content item. They may also define how these fields may be exploited by the presentation templates by mapping the field to one or more of the above-noted "Display Types"/"Placeholders". For instance, continuing with the above example, presentation process 10 (e.g., via the above-noted Content types) may allow presentation templates and/or associated "Display Types" to be selected for use to allow the appropriate content elements to be passed into the appropriate Presentation Template, which determines how the content is displayed. For example, the website managed via presentation process 10 and/or web content management application 20 may have many Presentation Templates used to present all the various content within the website, including such things as but not limited to, a slideshow, a gallery, a carousel, a feature, a summary, a short link, an article (full), etc.

In some implementations, at least the portion of the one or more presentation templates may be rendered 304 by presentation process 10 when the one or more content elements are requested, wherein rendering may include retrieving at least the portion of the one or more content elements from one or more of each content item to be rendered within each of the (e.g., selected) one or more presentation templates, wherein rendering may further include using the content type of the one or more content elements requested to dynamically map the one or more content elements defined in the one or more display types to the one or more presentation templates. In some implementations, the content elements may but need not have a content type associated directly with them. For instance, the content item they are set on may have the relationship to the content type. In some implementations, content item may refer to an entire content "document", e.g., a news article, which may include the content item's content type, and which in turn may have many elements within it, in that the item is "complete" and understandable (e.g., the necessary context of the item is present). By contrast, a single element from a content item may not make sense, e.g., a "Pull quote" element from the news article that may read "Jim says this is great" may lack the appropriate context. Assume for example purposes only that a user views a web page of the web site (not shown). Within the web page, a content item may be rendered within a specific presentation template. The presentation template may include a block of markup within which the above-noted placeholders may have been defined, which may identify information that may be pulled from the content item being rendered. When presentation process 10 encounters a placeholder within the presentation template, presentation process 10 may look up the "Content Type definition/Authoring Template" for the content item being rendered. Presentation process 10 may request the content type definition for the field that corresponds to the placeholder/display type that presentation process 10 is handling in the presentation template. The content definition may return (e.g., via web content management application 20) a field name that presentation process 10 may use to pull the field from the content item and output the value. Presentation process 10 may continue to the next placeholder and/or until the end of the presentation is reached.

In some implementations, content type may determine the available display types available for displaying a content item and the content elements. For example, for rendering, e.g., News articles, user 48 may determine that there are four of these views that are needed. In the example, presentation process 10 may enable user 48 (e.g., a content developer) to select the four Display Types to use (from the example list of Display Types shown in FIG. 5) and then define for each Display Type which content elements from items (e.g., based on the Authoring Template) will be passed into the Presentation Template for rendering (e.g., display). For instance, as will be discussed in greater detail below, presentation process 10 may enable user 48 to select a Summary Display Type (e.g., Summary Display Type 500) for the News Authoring Template and choose the title and opening paragraph to pass in as the content elements rendered 304 within the heading and summary tags respectively.

In some implementations, mapping 302 may include receiving 308 a selection of the one or more content elements. For instance, e.g., for another Authoring Template, presentation process 10 may (via user interface 400) enable user 48 to select different content elements (which may then be received 308 by presentation process 10) for the Display Type to pass into the same presentation component. For example, and referring at least to FIGS. 6-7, in a person profile item, presentation process 10 may enable user 48 to choose to pass in the person's name as the Heading and their position as the Summary. Editing an entry for the specified Display Type may enable the mapping of the content elements (e.g., content elements 700) from the Content type to the appropriate placeholders for the content elements in the Display Type. For example, user 48 may be able to see (via the above-noted user interface) that the Short Summary presentation template references the placeholders defined in the display type and uses markup (e.g. HTML) to render the requested content item in this example by wrapping the Heading placeholder within <h1> tags, followed by the Summary placeholder within <p> tags and provide the URL to the item by wrapping the Link placeholder within <a> tags. In some implementations, if a desired Display Template does not yet exist, presentation process 10 may enable user 48 to create the Display Type (e.g., using the example user interface 400), which may result in the creation of an associated (placeholder) Presentation Template that may be fully completed by user 48 at some later point in time.

As noted above, the Display Type may define one or more placeholder areas in the presentation template for replacement with at least the portion of the one or more content elements. Example placeholders (e.g., placeholder 600) are shown at least in FIGS. 6-7. In some implementations, rendering 304 may further include rendering 306, by the presentation template, the content item within the one or more presentation templates at a location indicated in a markup associated with the one or more presentation templates. For instance, referring at least to FIG. 7, the Summary display type may define a placeholder Image field. In the example, for News items, presentation process 10 may retrieve an image to show here from an element stored on the News item called, e.g., Primary Image. From another type of content item, presentation process 10 may use a differently named element (or not use this element). In some implementations, presentation process 10 may enable use of multiple presentations to be used. For instance, for a Summary display, presentation process 10 may enable a user that wants a Primary Summary presentation template used to display the above-noted placeholders shown in FIGS. 6-7 to do so, and may further enable the user to user an Alternative Summary presentation template for a different (e.g., smaller) set of placeholders. As an example, the Alternative set may include Heading, Description, and Link, and may be used by a Bookmark Content type (where the other elements might not be used). In some implementations, the Presentation Template may then reference the Display type and pull out the appropriate elements from the content to display. For instance, presentation process 10 may enable use of a different Presentation Template on a mobile device (e.g., using the Heading, Small Image and Link placeholders) versus, e.g., desktop use (e.g., using the Heading, Image, Paragraph Text and Link placeholders). In the example, presentation process 10 may, for each content type using this display type, use a different set of elements to map to the placeholders. For instance, the News item example is shown in one or more of the above-noted figures; however, a Press Release item may (via presentation process 10) pass in Title, Feature Image, Mobile Image, Body and URL. Presentation Templates may evolve to define (e.g., only or predominantly) how the content elements may be formatted for display by presentation process 10 and may resolve via the Content type's Display Type which content elements to render 304 within the placeholder areas in the markup (not shown).

For instance, for each Presentation Template created by user 48 (e.g., via presentation process 10), presentation process 10 may create (or maintain) an associated Display Type that defines the above-noted placeholders in each Presentation Template that may be replaced with a content element. In the example, when the above-noted content elements in a web page requested by a user is rendered 304, the above-noted content type of the content elements may be used to dynamically map the one or more display types to the one or more content elements in the Presentation Template. For example, items may be specifically referenced within the web page (or within other components of the web page), and/or may also be displayed dynamically by presentation process 10, e.g., if there is a list of "latest items" within the associated section of the web site (e.g., such that the same list may show different items depending on, e.g., which pages it is being used). In the example, the Display Type may be specified (and as the Presentation Template may be mapped 302 to the Display Type, this is returned). Otherwise, the item may be evaluated by presentation process 10 to check its content type and the display type to use first. In the examples, the Display type may have a direct association with the Presentation Template to use and may be calculated. As discussed above, it may be that there are multiple Presentation Templates associated with a single Display Type. There may, in some implementations, only be one Presentation Template for a specific Content Type for the Display type. In the example, if the item being rendered 304 includes a Bookmark item, and the web page (via presentation process 10) is rendering 304 the item in a list using the Summary display type, then presentation process 10 may utilize the Alternative Summary presentation template. In turn, presentation process 10 may, with the Presentation Template, assemble the markup to be delivered by, e.g., embedding the content elements (from the content item) defined within the Display Type within the Presentation Template.

The one or more presentation templates may enable display of a common view for different content types. For instance, rather than having multiple un-associated Presentation Templates with mostly the same markup (e.g., just referencing different elements from the various content types), presentation process 10 may provide, e.g., a single Presentation Template with the common markup referencing placeholder elements. Then, the Display Type passes in the correct elements into the above-noted placeholder fields, such that the Content Types (via presentation process 10) may map their elements to the correct places in the Presentation Template. As a result, the effort to maintain the content management system is reduced and a simpler mechanism to model and manage the presentation of the various types of content within the website is provided.

By abstracting the content elements used in the various Presentation Templates (views) from the definition of how the views may be displayed, presentation process 10 may enable a complete separation of content and presentation, but with a clear and explicit model of how the two are coupled. There are several non-limiting example results that may, in some implementations, be attributed to this approach. For instance:

1. True separation of content and design. For example, by presentation process 10 removing the need to include tags that reference the content elements, user 48 may completely control the design of the Presentation Templates and need not have the content model already built in order to understand how the content types are modeled within, e.g., web content management application 20. This may enable user 48 to focus on markup and style, and contribute the entire markup for the Presentation Template, which may enable the outsourcing of the design to agencies as well (as this may now be done first, and in isolation).

2. Reduced number of artifacts to manage. For example, by presentation process 10 mapping the different content elements within each content type to the various presentational elements within views, the number of components needed to provide these views of all of the different content types within the websites may be reduced. The same presentation component may be reused and may display different content appropriately with less development effort.

3. Clarity of the authoring and presentation models. For instance, generally, in web content management systems, to understand what elements are actually being displayed, user 48 must review each presentation template individually. There may be many components referenced within the presentation template to ensure that various content types are displayed appropriately, but it may make the template difficult to visualize and manage. The new model of the present disclosure may provide a clear view from the content type itself what will be displayed, and may therefore be simpler to review. The new example model described throughout may also allow a view from the smaller list of views how different elements are presented, and may also therefore be simpler to review. For example, presentation process 10 enables a user to see that a news item is going to be displayed in a Feature display, summary display, etc., such that the model is turned into a 2-way system. This may result in more clarity and the ability to better manage what is being done, since, e.g., the decision about what to show may be set from, e.g., user interface 400.

4. Simpler to update the presentation model to reflect changes made to content types. For example, with a mapping of elements from the content type to the Presentation Template fields, it may be possible to identify when content elements change and either cancel the modifications to ensure referential integrity and/or allow them with an indication (e.g., alert) that the Presentation Templates may need to be updated (and with the particular mappings).

5. High performance pattern. Rendering 304 at least the portion of the one or more content elements in the web page may further include pre-caching 310 one or more views of the web page. For instance, in some implementations, rather than having presentation process 10 define what is pulled into the display at page assembly time, the display may be known at the design and/or publishing time. This may mean that the various views of the content item may be effectively pre-cached 310 by presentation process 10, such that each view may already be computed and rendered by presentation process 10 within the associated presentation component instead of having presentation process 10 resolve the reference to the content elements at the page request time. Pre-caching 310 may provide a benefit to sites that may have to deal with delivering many dynamic web pages to site visitors in a reasonable amount of time.

6. Simpler to design. For example, an example challenge in designing the presentation layer of a website that will be managed by web content management application 20 may be that the creative team designing the website may need to take the web pages that they create and deconstruct them into page components and replace text and images within them into tags that may pull the correct content elements into the components. However, by moving to the above-described model where the page components may provide a placeholder area, designers may be allowed to more easily replace "dummy" content used for, e.g., mockups.

While one or more example user interfaces may be shown and described, it will be appreciated that other user interface implementations may be used to provide similar or varying functionality without departing from the scope of the disclosure. As such, the above-described user interface should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
receiving, by a computing device, a selection of one or more presentation templates of a plurality of presentation templates for at least a portion of a web page, wherein the one or more presentation templates define, at least in part, a display format for one or more placeholder fields, the one or more placeholders fields defining one or more areas in the presentation template to be replaced by one or more content elements, wherein the one or more content elements are one or more external pieces of data needed to complete a presentation;
referencing, at least in part, a display type associated with the presentation template to determine a selection of the one or more content elements;
mapping at least a portion of the one or more placeholder fields to the one or more content elements within an authoring template based upon, at least in part, the display type, the one or more placeholder fields mapping to a different set of content elements for each of a plurality of different content types, wherein the content elements are defined by the content types; and
rendering at least the portion of the one or more presentation templates when the one or more content elements are requested, wherein rendering includes requesting an authoring template definition for a field corresponding to each of the one or more placeholder fields;
receiving a field name for the field corresponding each of the one or more placeholder fields based upon the authoring template definition, and retrieving at least the portion of the one or more content elements from one or more of each content item to be rendered within each of the one or more presentation templates, based upon the authoring template of the one or more content elements requested and the mapping between the one or more content elements and the one or more placeholder fields defined in the one or more presentation templates.

2. The computer-implemented method of claim 1 wherein the one or more placeholder fields defines one or more external dependencies to be filled by the one or more content items for rendering via the one or more presentation templates.

3. The computer-implemented method of claim 2 wherein rendering further includes rendering the content item within the one or more presentation templates at a location indicated in a markup associated with the one or more presentation templates.

4. The computer-implemented method of claim 1 wherein mapping includes receiving a selection of the one or more content elements.

5. The computer-implemented method of claim 1 wherein the one or more presentation templates enable display of a common view for different authoring templates.

6. The computer-implemented method of claim 1 wherein rendering further includes pre-caching one or more views of the web page.

7. The computer-implemented method of claim 1 wherein the one or more placeholder fields is selected via a user interface.

* * * * *